United States Patent
Wang et al.

(10) Patent No.: US 9,348,478 B2
(45) Date of Patent: May 24, 2016

(54) TOUCH PANEL WITH MULTI-FUNCTION SINGLE PLATE

(71) Applicant: Wistron Corporation, New Taipei (TW)

(72) Inventors: Kuei-Ching Wang, New Taipei (TW); Ta-Hu Lin, New Taipei (TW)

(73) Assignee: Wistron Corporation, Hsichih, New Taipei (TW)

(*) Notice: Subject to any disclaimer, the term of this patent is extended or adjusted under 35 U.S.C. 154(b) by 30 days.

(21) Appl. No.: 13/901,591

(22) Filed: May 24, 2013

(65) Prior Publication Data

US 2013/0342226 A1   Dec. 26, 2013

(30) Foreign Application Priority Data

Jun. 21, 2012 (TW) .............................. 101211969 U

(51) Int. Cl.
*G06F 3/045* (2006.01)
*G06F 3/041* (2006.01)

(52) U.S. Cl.
CPC ................ *G06F 3/045* (2013.01); *G06F 3/041* (2013.01); *G06F 2203/04102* (2013.01); *G06F 2203/04107* (2013.01); *G06F 2203/04111* (2013.01); *G06F 2203/04112* (2013.01)

(58) Field of Classification Search
USPC .......... 324/691, 679; 345/173, 156, 174, 690, 345/176; 430/41, 523, 5, 531, 530, 60; 174/253, 250
See application file for complete search history.

(56) References Cited

U.S. PATENT DOCUMENTS

| | | | | |
|---|---|---|---|---|
| 2008/0264699 | A1* | 10/2008 | Chang et al. | 178/18.01 |
| 2008/0309635 | A1* | 12/2008 | Matsuo | 345/173 |
| 2009/0051668 | A1* | 2/2009 | Cheng | 345/173 |
| 2010/0045613 | A1* | 2/2010 | Wu et al. | 345/173 |
| 2011/0096017 | A1* | 4/2011 | Li et al. | 345/174 |
| 2011/0227842 | A1* | 9/2011 | Lin et al. | 345/173 |
| 2011/0298750 | A1* | 12/2011 | Wang et al. | 345/174 |
| 2012/0007824 | A1* | 1/2012 | Mi | 345/174 |
| 2012/0249465 | A1* | 10/2012 | Lin et al. | 345/173 |
| 2012/0299863 | A1* | 11/2012 | Yilmaz | 345/174 |

FOREIGN PATENT DOCUMENTS

CN            101840292 A        9/2010

OTHER PUBLICATIONS

Office action mailed on Nov. 4, 2015 for the China application No. 201310219085.8, filing date:Jun. 4, 2013, p. 3 Line 4-30 and p. 4-7.

* cited by examiner

*Primary Examiner* — Melissa Koval
*Assistant Examiner* — Nasima Monsur
(74) *Attorney, Agent, or Firm* — Winston Hsu; Scott Margo

(57) ABSTRACT

A touch panel with single plate includes a plate and a sensing circuit structure. The plate is used as a cover. The sensing circuit structure includes a transparent conductive layer. The transparent conductive layer has a plurality of first transparent conductive portions and a plurality of second transparent conductive portions. The first transparent conductive portions are substantially disposed on the plate along with a first axis. The second transparent conductive portions are substantially disposed on the plate along with a second axis.

5 Claims, 8 Drawing Sheets

TOUCH PANEL WITH MULTI-FUNCTION SINGLE PLATE

BACKGROUND OF THE INVENTION

1. Field of the Invention

The present invention relates to a touch panel, and more particularly, to a multi-functional single plate touch panel.

2. Description of the Prior Art

Various types of touch input technology are widely used in electronic products, e.g. mobile phones and tablet PCs, which use a touch panel as an input device, such that a user may perform touch operations on the touch panel to input commands, e.g. drag a finger to move a cursor or write words on the touch panel. Also, the touch panel may cooperate with a display panel to show virtual keys for being selected by the user to input characters and words.

In general, touch panels are categorized into resistive, capacitive, ultrasound, and infrared types, wherein the resistive touch panels are the most popular. The resistive touch panels may be further categorized into 4-wire, 5-wire, 6-wire, and 8-wire touch panels, wherein the 4-wire touch panels have been widely manufactured and applied due to consideration of cost and technology maturity.

A touch plate includes two plates, a trace layer formed in the plate, an insulation layer, and a flexible printing circuit (FPC) pattern, etc., wherein the trace layer, insulation layer, and the FPC pattern are disposed between the two plates. Usually, one of the plates is used as a substrate of each structural layer and the other plate closer to the operation side is used as a cover lens. However, the panel may be thicker in such case, which does not comply with current trend.

Therefore, how to design a lighter and thinner touch panel by a modularized process has become an important topic in the industry.

SUMMARY OF THE INVENTION

It is therefore an objective of the present invention to provide a thin touch panel by designing a sensing circuit structure on a plate so that the touch function is realized in the single plate, which reduces additional laminating procedures. Moreover, the plate is disposed on the operation side of the touch panel in order to fully cover and protect internal traces.

Another objective of the present invention is to provide a thin touch panel, wherein the plate of the touch panel has both functions of touch control and protection. Besides, the plate covers the sensing circuit structures, the traces in a border, and other internal components, and therefore, it further decorates the panel and prevents traces from being seen by the users.

To achieve above objectives, a single plate touch panel of the present invention includes a plate and a sensing circuit structure, wherein the plate is used as a cover lens, and the sensing circuit structure includes a transparent conductive layer. The transparent conductive layer has a plurality of first transparent conductive portions and a plurality of second transparent conductive portions. The first transparent conductive portions are substantially disposed on the plate along with a first axis, and the second transparent conductive portions are substantially disposed on the plate along with a second axis.

Another single plate touch panel of the present invention includes a plate and a sensing circuit structure, wherein the plate is used as a cover lens, and the sensing circuit structure has the masking function and includes a transparent conductive layer. The transparent conductive layer includes a plurality of first transparent conductive portions and a plurality of second transparent conductive portions, wherein the first transparent conductive portions are substantially disposed on the plate along with a first axis, and the second transparent conductive portions are substantially disposed on the plate along with a second axis.

The other single plate touch panel of the present invention includes a plate, a sensing circuit structure, and a masking structure or a masking body. The plate is used as a cover lens. The sensing circuit structure includes a transparent conductive layer. The transparent conductive layer includes a plurality of first transparent conductive portions and a plurality of second transparent conductive portions, wherein the first transparent conductive portions are substantially disposed on the plate along with a first axis, and the second transparent conductive portions are substantially disposed on the plate along with a second axis. The masking structure or the masking body is disposed on the plate.

In an embodiment of present invention, the plurality of first transparent conductive portions and the plurality of second transparent conductive portions are disposed at the same side of the plate.

In an embodiment of present invention, the sensing circuit structure further includes a conductive decoration pad, a decoration layer, and a non-transparent conductive layer. The conductive decoration pad is disposed on the transparent conductive layer. The decoration layer is disposed on the transparent conductive layer and the conductive decoration pad, wherein the conductive decoration pad has an opening. The non-transparent conductive layer is disposed on the decoration layer and electrically connected with the transparent conductive layer via the opening.

In an embodiment of present invention, the conductive decoration pad completely covers the opening. The conductivity of the conductive decoration pad is superior to that of the decoration layer, and the color of the conductive decoration pad is similar to that of the decoration layer.

In an embodiment of present invention, a portion of the non-transparent conductive layer is disposed on the opening; in another embodiment of present invention, the sensing circuit structure further includes a conductive filler, wherein the filler is disposed on the opening; and in the other embodiment of present invention, a portion of the non-transparent conductive layer and a conductive filler are disposed on the opening.

In an embodiment of present invention, the sensing circuit structure further includes a masking decoration layer, a transparent conductive connecting layer, and a non-transparent conductive layer. The masking decoration layer is disposed on the plate and the transparent conductive layer. The transparent conductive connecting layer is disposed on the transparent conductive layer and the masking decoration layer and is extended from the transparent conductive layer toward the masking decoration layer that exceeds the boundary of the transparent conductive layer. The non-transparent conductive layer is disposed on the masking decoration layer and the transparent conductive connecting layer, but is not disposed on the transparent conductive layer.

In an embodiment of present invention, the non-transparent conductive layer on the masking decoration layer extends toward the transparent conductive layer but does not exceed the boundary of the transparent conductive layer.

In an embodiment of present invention, the material of the masking decoration layer includes various colors of insulation ink. The material of the transparent conductive connecting layer includes a conductive polymer material or Indium tin oxide (ITO), and the material of the non-transparent conductive layer includes silver adhesive, copper, molybdenum, or aluminum.

In an embodiment of present invention, the color of the masking decoration layer is arbitrary but not in accordance with the color of the transparent conductive connecting layer.

In an embodiment of the present invention, the masking decoration layer has an opening on the transparent conductive layer, and the transparent conductive connecting layer is filled in the opening. The sensing circuit structure further includes another masking decoration layer disposed on the transparent conductive connecting layer to cover the opening.

In an embodiment of present invention, the transparent conductive layer defines a touch-sensing circuit by a plurality of first transparent conductive portions and a plurality of second conductive portions.

In an embodiment of present invention, the sensing circuit structure further includes a pin and a conductive bonding material, wherein the conductive bonding material is bonded with the pin and the non-transparent conductive layer.

In an embodiment of present invention, the touch panel may be rigid or flexible.

From above description for the single plate touch panel of the present invention, the plate is used for disposing the sensing circuit structure to enable conventional touch control functions. The plate is also used as a cover lens because the single plate is disposed at the operation side of the touch panel. Therefore, the circuits and components under the plate are protected without being exposed. Besides, in the implementation, the sensing circuit structure disposed on the plate also has a shielding function, or alternatively, the masking structure or masking body may be additionally disposed on the plate. Thus, when the plate covers the border traces or other components that should be concealed, it also masks and decorates the panel, which facilitates a full-flat touch panel.

The single-plate and multi-functional touch panel of the present invention may be realized by improving a structure of the plate. In comparison with conventional technologies, the touch panel enables the touch control function by using only a single plate without laminating an additional protective film or cover lens to maintain its structural hardness as conventional touch panels. Thus, there is no need to use another plate to form the touch panel, which further reduces the space and cost of laminating the protective film or cover lens and facilitates a thin touch panel.

These and other objectives of the present invention will no doubt become obvious to those of ordinary skill in the art after reading the following detailed description of the preferred embodiment that is illustrated in the various figures and drawings.

DETAILED DESCRIPTION

Descriptions below refer related figures to illustrate preferred embodiments of a single plate touch panel, wherein the same elements are illustrated with the same symbols.

The touch panel of the present invention has a single plate with multiple functions at least including touch control and protection functions, or preferably, including touch control, protection, and decoration functions. The present invention makes the touch panel thinner and simplifies the additional laminating or assembly procedures so that the touch panel is suitable to be manufactured through a modularized process. Based on the above concept, the present invention may apply to different embodiments. Descriptions below illustrate the invention mainly based on two structures, which however, are not limited herein. In other words, other embodiments that comply with the above concept should be within the scope of the present invention as well.

Figure 1A:
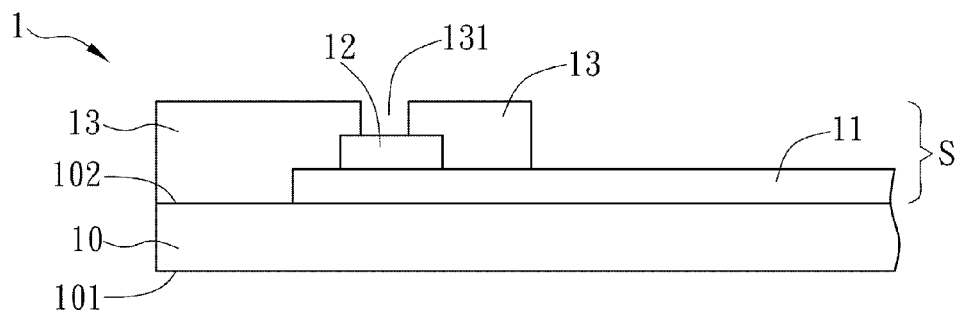
FIG. 1A to FIG. 1D are schematic diagrams of a touch panel according to a preferred embodiment of the present invention respectively.

FIG. 1A to FIG. 1D are schematic diagrams of a touch panel 1 according to a preferred embodiment of the present invention. As shown in FIG. 1A, the touch panel 1 includes a plate 10 and a sensing circuit structure S. The plate 10 is used as a cover lens. The sensing circuit structure S is disposed on the plate 10, and includes a transparent conductive layer 11, a conductive decoration pad 12, and a decoration layer 13. The transparent conductive layer 11 is disposed on the plate 10, the conductive decoration pad 12 is disposed on the transparent conductive layer 11, and the decoration layer 13 is disposed on the transparent conductive layer 11 and the conductive decoration pad 12, wherein the decoration layer 13 has an opening 131 located above the conductive decoration pad 12. The plate 10 is a transparent plate which may be a substrate or a film such as a transparent plastic plate, a transparent plastic film, a transparent glass plate, or a transparent glass film. Certainly, the plate 10 may also be made of Polyethylene terephthalate (PET). In other words, the touch panel 1 may be a rigid or a flexible touch panel in accordance with the material of the plate 10.

For example, the sensing circuit structure S is formed on the plate 10 to provide the touch control function. Besides, operations to the touch panel 1 are performed at the outer surface 101 of the plate 10. Therefore, the plate 10 covers the sensing circuit structure S and other components, which therefore, are not exposed to the outside world and thereby are prevented from direct contact. In addition, the plate 10 has a certain level of hardness so as to be used as a cover lens for protecting the touch panel.

The sensing circuit structure S may be formed on the plate 10 by using following procedures:

form a transparent conductive layer 11 on the plate 10;

form a conductive decoration pad 12 on the transparent conductive layer 11; and form a decoration layer 13 on the conductive decoration pad 12, wherein the decoration layer 13 has an opening 131 above the conductive decoration pad 12.

The transparent conductive layer 11 defines a touch-sensing circuit after a patterning process, where a material of the transparent conductive layer 11 is, for example, indium tin oxide (ITO), and a material of the decoration layer 13 is, for example, an insulation material. The transparent conductive layer 11 defines a plurality of conductive wires as the touch-sensing circuit in the touch input area of the touch panel 1, wherein the transparent conductive layer 11 in the touch input area is not covered by the decoration layer 13.

The outer surface 101 of the plate 10 is for user's operation. Usually, the user views and operates the touch panel 1 from the outer surface 101. The rest of the layer structures and the components are disposed on the inner surface 102 of the plate 10.

Figure 1B:
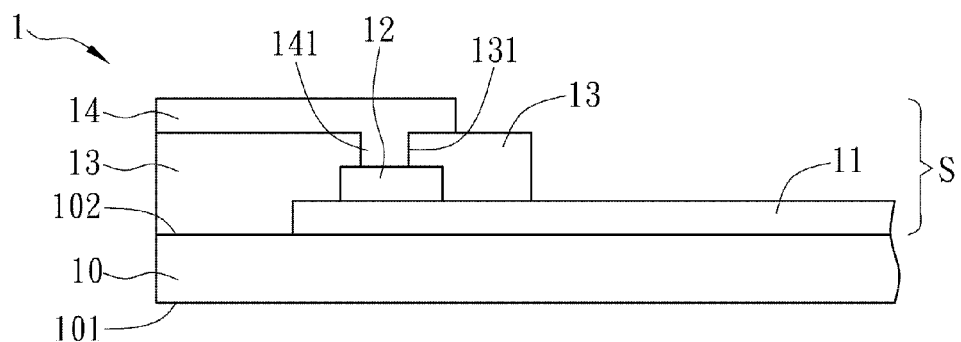

Then, as shown in FIG. 1B, the sensing circuit structure S includes a non-transparent conductive layer 14. The non-transparent conductive layer 14 is disposed on the decoration layer 13, and is electrically connected with the transparent conductive layer 11 via the opening 131. The non-transparent conductive layer 14, which may be made of silver adhesive, may define a fine trace by using a screen printing equipment collaborated with a silk screen. A portion 141 of the non-transparent conductive layer 14 is filled into the opening 131 and is connected with the transparent conductive layer 11. The silver adhesive material of the non-transparent conductive layer 14 may be silver nano-particles or silver micron-particles, or even better to be conductive metal such as titanium, zinc, zirconium, antimony, indium, tin, copper, molybdenum and aluminum.

For example, after each layer in FIG. 1A is formed, the non-transparent conductive layer 14 is formed on the decoration layer 13. Since the conductive decoration pad 12 fully covers the opening 131, and the conductivity of the conductive decoration pad 12 is superior to that of the decoration layer 13, the non-transparent conductive layer 14 and the transparent conductive layer 11 are electrically connected via the conductive decoration pad 12 but not via the decoration layer 13.

The shape of the conductive decoration pad 12 may be arbitrary, and the color of the conductive decoration pad 12 is not limited. However, in order to have better visual effects, the color of the conductive decoration pad 12 is similar with that of the decoration layer 13, i.e., a color similarity between the color of the conductive decoration pad and the color of the decoration layer is below a specific value. Therefore, the user is hard to find the difference between the conductive decoration pad 12 and the decoration layer 13 when viewing the touch panel 1 from the outer surface 101. A portion 141 of the non-transparent conductive layer 14 is disposed in the opening 131. Under a preferred condition, the opening 131 is filled with the material of the non-transparent conductive layer 14. Even though the opening 131 is not filled up with the material of the non-transparent conductive layer 14, the user may not find the color difference because when viewing the touch panel 1 from the outer surface 101, the conductive decoration pad 12 covers the opening 131 such that the color difference is masked, which compensates for the misalignment issue during manufacturing.

For example, the conductive decoration pad 12 may be made of carbon, nano-copper, nano-silver, polymer conductive resin, etc., but is not limited thereto. The decoration layer 13 may be made of various colors of insulation ink, but is not limited thereto.

Furthermore, the non-transparent conductive layer 14 does not extend over the decoration layer 13, and the material of the non-transparent conductive layer 14 may be metal.

Figure 1C:
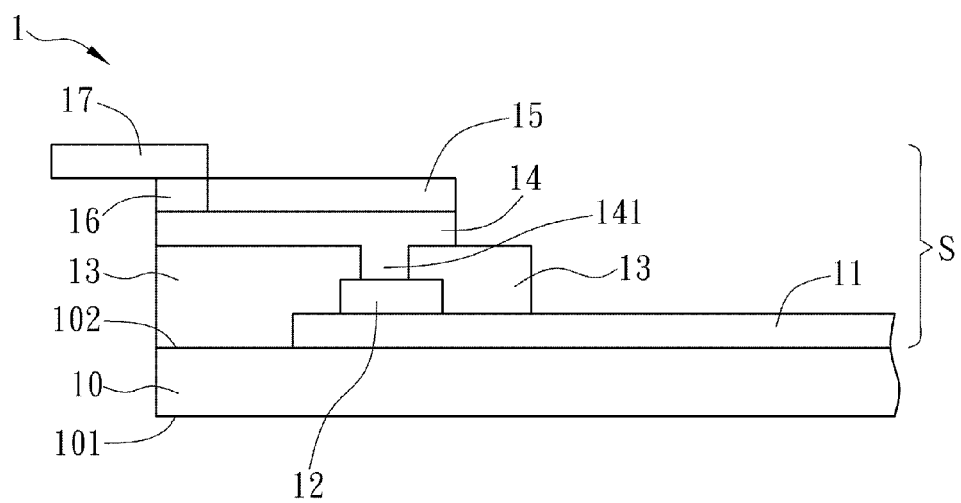

As shown in the FIG. 1C, the sensing circuit structure S further includes an insulation layer 15, a conductive bonding material 16, and a pin 17, wherein the insulation layer 15 is disposed on the non-transparent conductive layer 14, and the pin 17 is bonded with the non-transparent conductive layer 14 via the conductive bonding material 16.

For example, the insulation layer 15 covers the non-transparent conductive layer 14 by screen printing to protect the non-transparent conductive layer 14 from air oxidation. The pin 17, which may be the pin of the flexible printed circuit board (FPC), is fixed on the non-transparent conductive layer 14 beside the insulation layer 15 via the conductive bonding material 16, and is electrically connected with the transparent conductive layer 11 via the conductive bonding material 16 and the non-transparent conductive layer 14. The conductive bonding material 16 may be an anisotropic conductive film (ACF) or an anisotropic conductive paste (ACP).

Figure 1D:
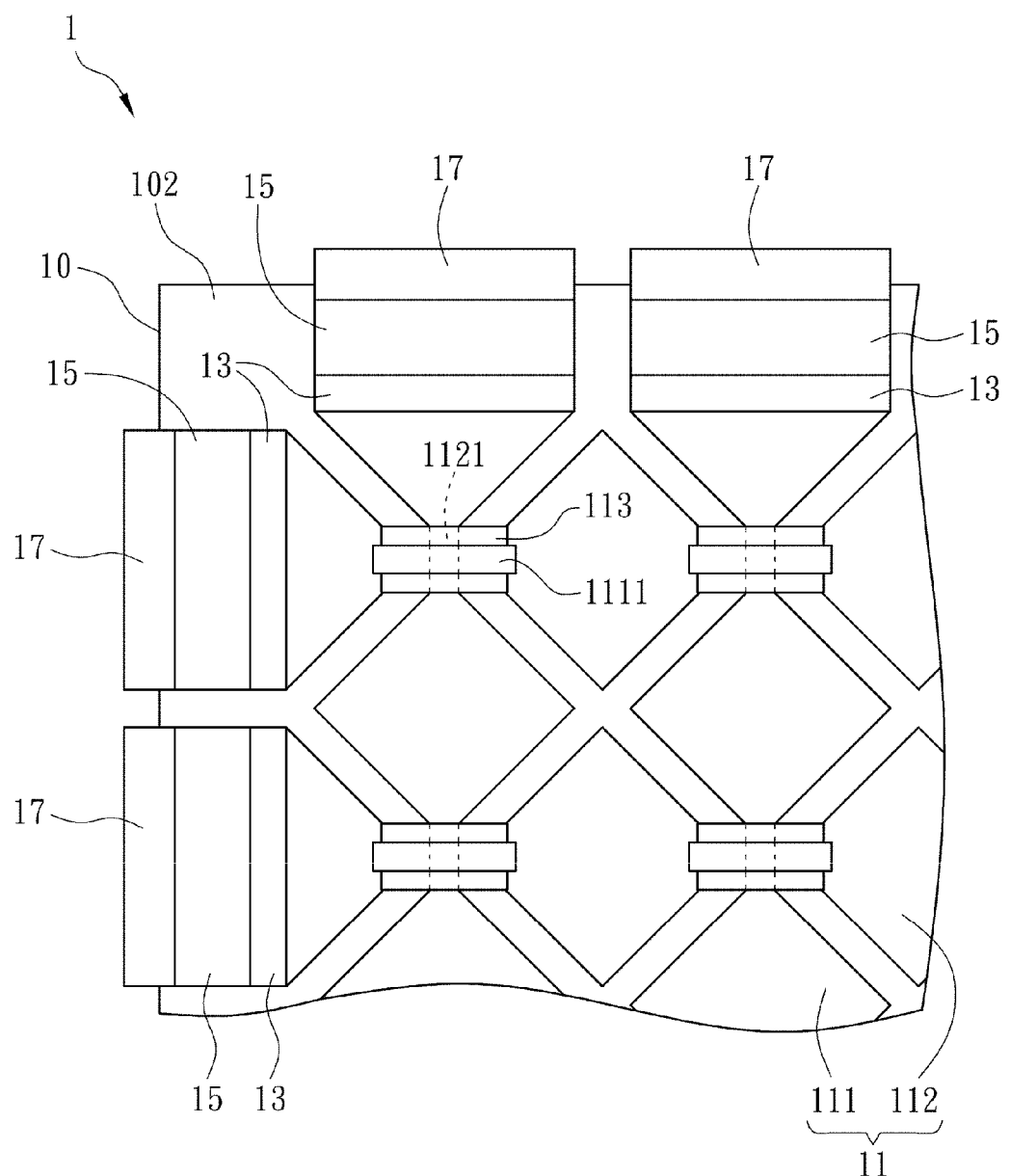

Next, please refer to FIG. 1D, which shows a top-view diagram of the touch panel 1. The transparent conductive layer 11 includes a plurality of first transparent conductive portions 111 and a plurality of second transparent conductive portions 112. Each first transparent conductive portion 111 is disposed side by side along with a first axis on the inner surface 102 of the plate 10, and each second transparent conductive portion 112 is disposed side by side along with a second axis on the inner surface 102 of the plate 10. In this embodiment, each first transparent conductive portion 111 is disposed along with the y-axis while each second transparent conductive portion 112 is disposed along with the x-axis. Certainly, in a practical implementation, each first transparent conductive portion 111 may be disposed along with the x-axis while each second transparent conductive portion 112 may be disposed along with the y-axis.

In this embodiment, each first transparent conductive portion 111 and each second transparent conductive portion 112 are respectively disposed in accordance with a pin 17. The first transparent conductive portions 111 and the second transparent conductive portions 112 include a plurality of conductive patterns, where each conductive pattern is composed of cross-connected connection elements 1111, 1121. The conductive pattern may be, for example, a triangular pattern, a quadrilateral pattern, a circular pattern, or an arbitrary polygonal pattern. In FIG. 1D, the shape of the conductive pattern is quadrilateral, which however, is not limited thereto. Moreover, the shape of the first transparent conductive portions 111 and the second transparent conductive portions 112 may also be rectangular, and the patterns of the first transparent conductive portions 111 and the second transparent conductive portions 112 may be screen printed on the inner surface 102 of the plate 10.

Besides, as shown in FIG. 1D, the insulation element 113 is disposed between the connection element 1111 and the connection element 1121, i.e., the first transparent conductive portions 111 connect with each other by crossing over the second transparent conductive portions 112 to prevent from shorting the first transparent conductive portions 111 and the second transparent conductive portions 112.

Figure 2A:
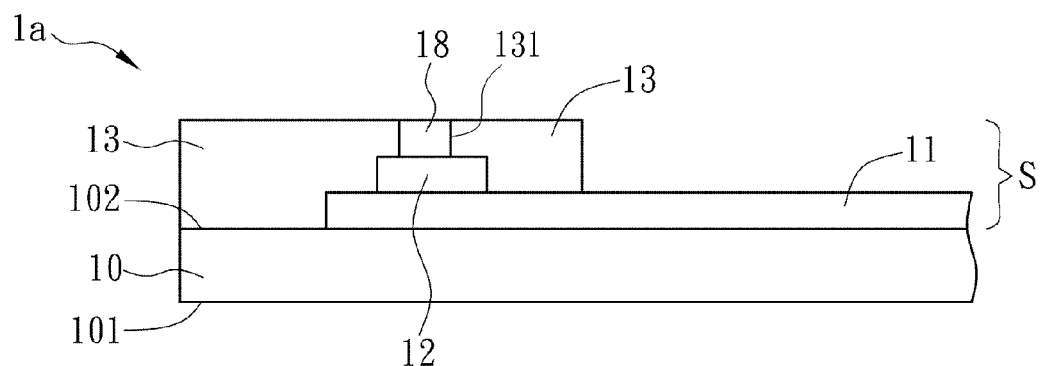
FIG. 2A to FIG. 2C are schematic diagrams of a touch panel according to anther preferred embodiment of the present invention respectively.
Figure 2B:
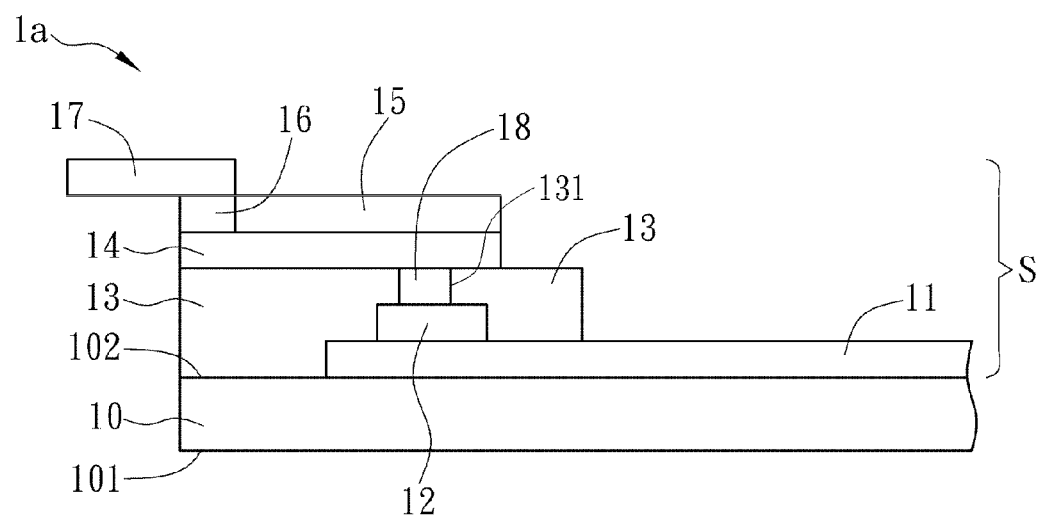
Figure 2C:
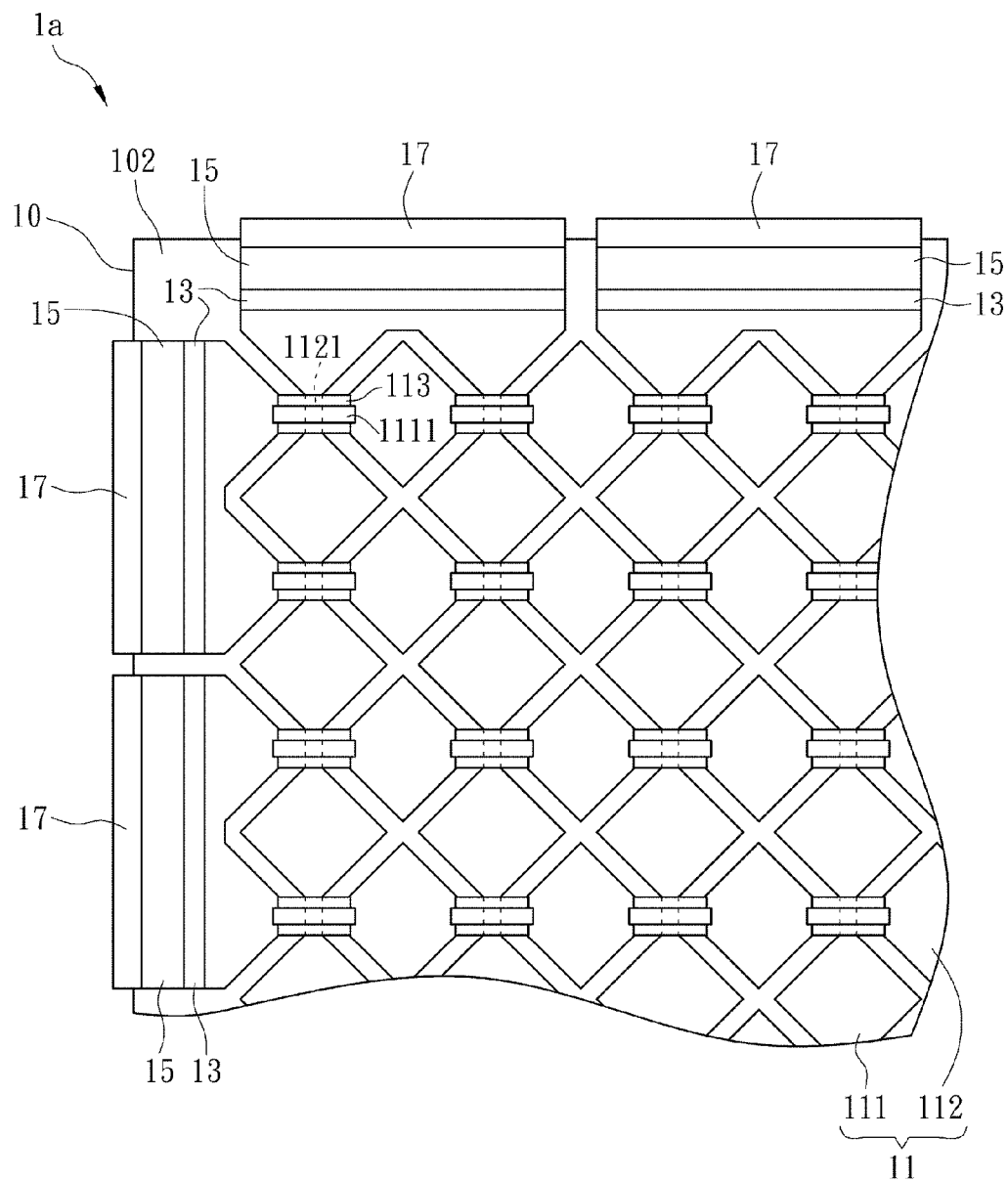

FIG. 2A to FIG. 2C are schematic diagrams of a touch panel 1a according to a preferred embodiment of the present invention. As shown in FIG. 2A, the transparent conductive layer 11 is disposed on the plate 10, the conductive decoration pad 12 is disposed on the transparent conductive layer 11, and the decoration layer 13 is disposed on the transparent conductive layer 11 and the conductive decoration pad 12, wherein the decoration layer 13 has an opening 131 above the conductive decoration pad 12 and a conductive filler 18 is disposed in the opening 131. The structure and manufacturing processes of the transparent conductive layer 11, the conductive decoration pad 12, and the decoration layer 13 are similar with those of in FIG. 1A.

As shown in FIG. 2B, the non-transparent conductive layer 14 is disposed on the decoration layer 13 and the conductive filler 18, i.e., the opening 131 is filled by the conductive filler 18 first, and then the non-transparent conductive layer 14 is formed on the decoration layer 13 and the conductive filler 18.

Next, similar with FIG. 1C, the insulation layer 15 is disposed on the non-transparent conductive layer 14, and the pin 17 is bonded with the non-transparent conductive layer 14 via the conductive bonding material 16.

FIG. 2C shows a top-view diagram of the touch panel 1a. In this embodiment, two first transparent conductive portions 111 are disposed in accordance with a pin 17, and two second transparent conductive portions 112 are disposed in accordance with a pin 17. Each first transparent conductive portion 111 is disposed along with the y-axis while each second transparent conductive portion 112 is disposed along with the x-axis.

Figure 3A:
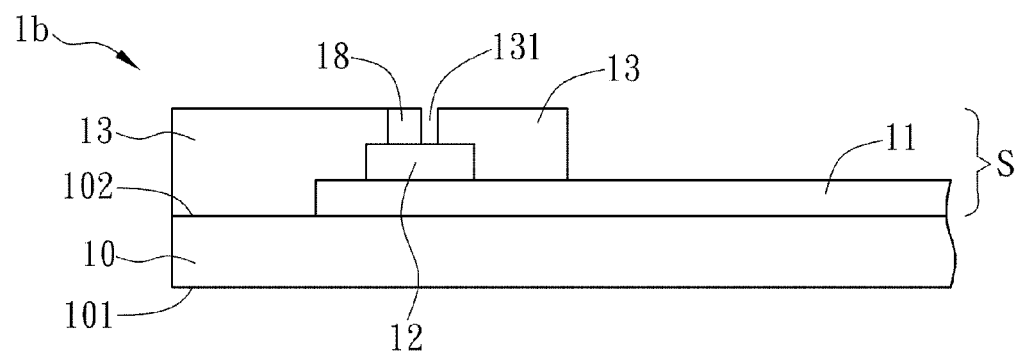
FIG. 3A to FIG. 3C are schematic diagrams of a touch panel according to a further preferred embodiment of the present invention respectively.
Figure 3B:
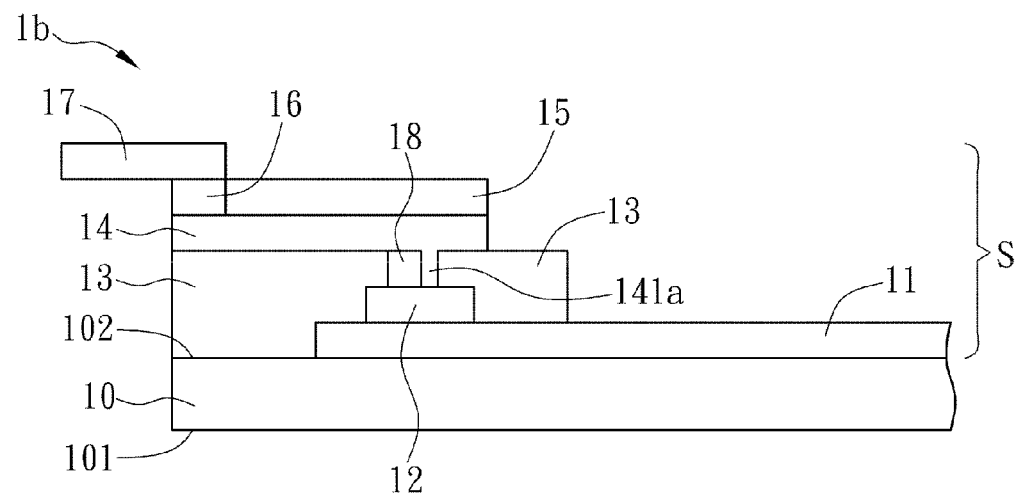
Figure 3C:
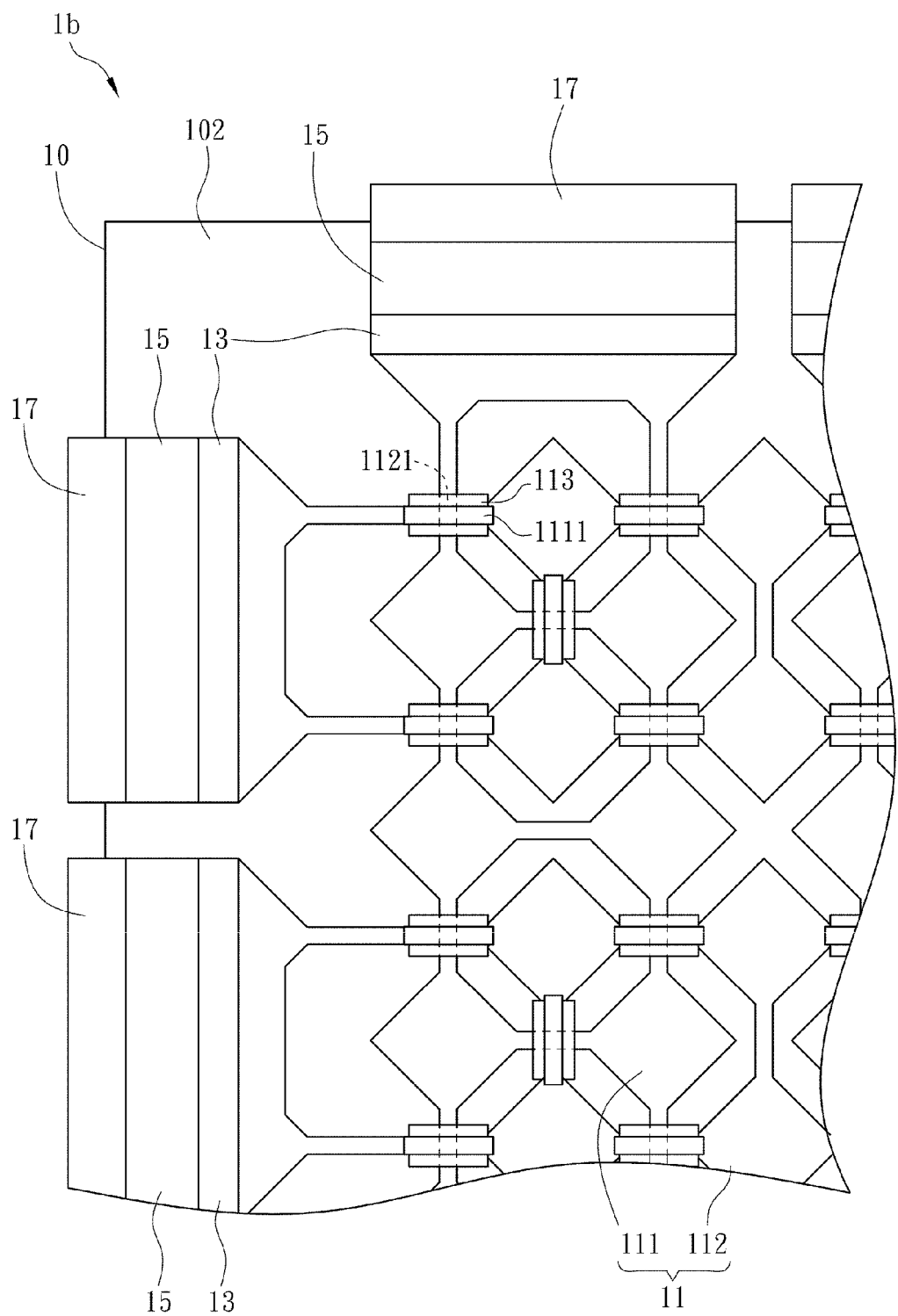

FIG. 3A to FIG. 3C shows schematic diagrams of a touch panel 1b according to a preferred embodiment of the present invention. As shown in FIG. 3A, the transparent conductive layer 11 is disposed on the plate 10, the conductive decoration pad 12 is disposed on the transparent conductive layer 11, and the decoration layer 13 is disposed on the transparent conductive layer 11 and the conductive decoration pad 12, wherein the decoration layer 13 has an opening 131 above the conductive decoration pad 12 and a conductive filler 18 is disposed in but does not fill up the opening 131. The structure and manufacturing processes of each layer are similar with those of in FIG. 1A.

As shown in FIG. 3B, the non-transparent conductive layer 14 is disposed on the decoration layer 13 and the conductive filler 18, and the space inside the opening 131 not filled up by the conductive filler 18 is filled by a portion 141a of the non-transparent conductive layer 14, i.e., the opening 131 is filled by the conductive filler 18 first, and then the non-transparent conductive layer 14 formed on the decoration layer 13 and the conductive filler 18 also fills into the un-filled space of the opening 131. Next, similar to FIG. 1C, the insulation layer 15 is disposed on the non-transparent conductive layer 14, and the pin 17 is bonded with the non-transparent conductive layer 14 via the conductive bonding material 16.

Because the conductive decoration pad 12 is disposed above the plate 10, the opening 131, the non-transparent conductive layer 14, and the conductive filler 18 are concealed anyhow when the user sees the touch panels 1-1b from the outer surface 101, so as to make up for the misalignment issue during manufacturing.

Next, please refer to FIG. 3C, which shows a top-view diagram of the touch panel 1b. The first transparent conductive portions 111 are disposed along with the y-axis while the second transparent conductive portions 112 are disposed along with the x-axis. In this embodiment, two first transparent conductive portions 111 are connected to a pin 17, and two second transparent conductive portions 112 are connected to another pin 17. The adjacent transparent conductive portions which connect to the same pin 17, either for the first transparent conductive portions 111 or the second transparent conductive portions 112, further include a plurality of connection elements 1111, 1121 for connecting the adjacent conductive patterns. Therefore, if one of the first transparent conductive portions 111 or the second transparent conductive portions 112 is broken or damaged, the other first conductive portions 111 or the second transparent conductive portions 112 can still work normally to transmit signals.

In the above embodiments, when the plate is a film, the touch panel may be a flexible touch panel. On the other hand, when the plate is a glass, the touch panel may be a rigid touch panel. Certainly, when the plate is a flexible glass, the touch panel may still be flexible.

In the above embodiments, the touch panels 1-1b may be single plate panels. The plate 10 has three functionalities: the first is to form the sensing circuit structure, the second is to be the cover lens, and the third is to mask the internal traces and components. Therefore, the touch panels 1-1b do not require an additional plate so that the panels are thinner and thereby achieve better light penetration rates. Moreover, since only a plate is used, there is no need to laminate two plates, which prevents from yield loss induced by laminating process and thus increases the yield. Besides, the manufacturing cost is reduced owing to a saving of the laminating process and assistant materials thereof such as transparent adhesive, thin film or glass cover. One plate and optical clear adhesive (OCA) are also saved. In the above embodiments, the opening is used for electrical connection between the non-transparent conductive layer and the transparent conductive layer either directly or indirectly. Also, the opening of the decoration layer is located at the conductive decoration pad above the transparent conductive layer so that the conductive decoration pad and the decoration layer may conceal the border traces of the touch panel. Furthermore, the touch penal of the present invention only requires a single plate, which is beneficial for making thinner products.

Figure 3D:
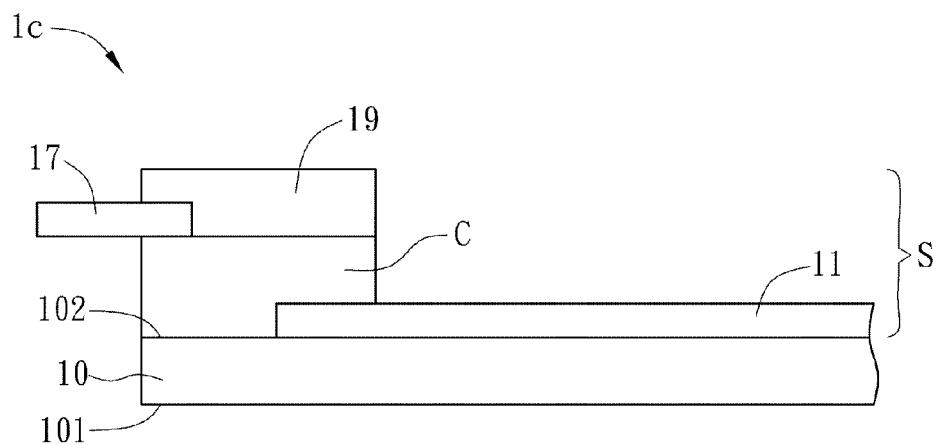
FIG. 3D is a schematic diagram of a touch panel according to a further preferred embodiment of the present invention.

FIG. 3D is a schematic diagram of a touch panel 1c according to another preferred embodiment of the present invention. In FIG. 3D, the touch panel 1c is mostly the same as the touch panels 1-1b, except that a further included masking structure 19 is disposed on the plate 10 via the sensing circuit structure S. The masking structure 19 may be a decoration layer that is printed by various colors of insulation ink for masking effect. Because of the deposition of the masking structure 19, there is no need to dispose the decoration layer (as the decoration layer 13 shown in FIG. 3B) within the periphery conductive structure C so that the processes and the cost are saved. Certainly, the touch panel may include a masking structure and also dispose a decoration layer on the sensing circuit structure to enhance the masking effect.

Besides, in other embodiments, the touch panel may have a masking body to replace the masking structure, where the difference between the masking body and the masking structure is that the masking body is more stereoscopic, which is, for example, thicker than the masking structure or a specific formed body.

Figure 4A:
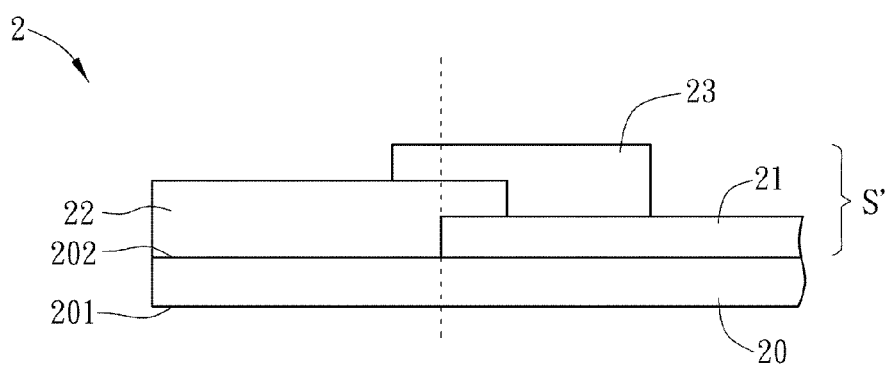
FIG. 4A to FIG. 4C are schematic diagrams of a touch panel according to a further preferred embodiment of the present invention respectively.
Figure 4B:
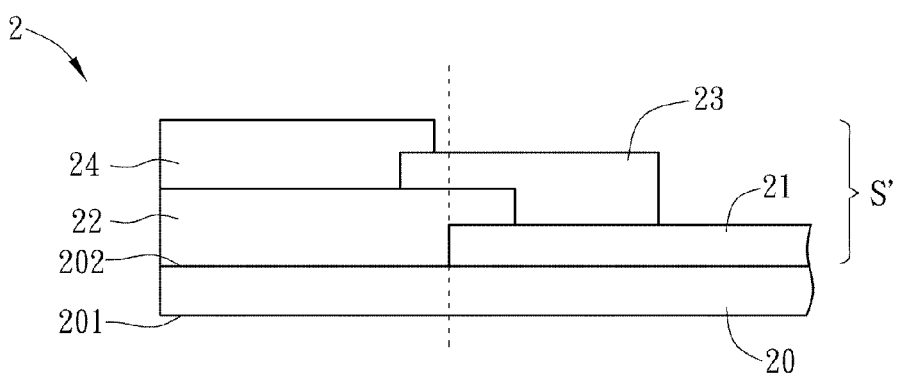
Figure 4C:
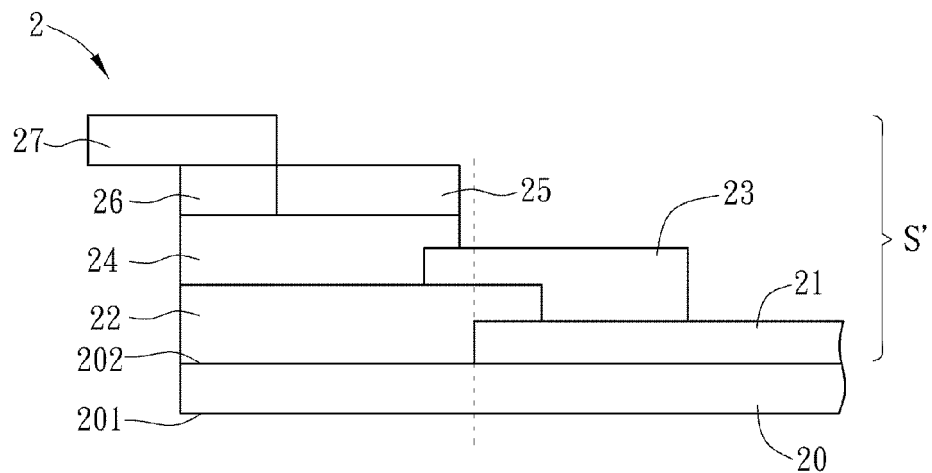

FIG. 4A to FIG. 4C are schematic diagrams of a touch panel 2 according to a preferred embodiment of the present invention. In FIG. 4A, the touch panel 2 includes a plate 20 and a sensing circuit structure S', wherein the plate 20 is used as a cover lens and the sensing circuit structure S' is disposed on the plate 20. The sensing circuit structure S' includes a transparent conductive layer 21, a masking decoration layer 22, and a transparent conductive connecting layer 23. The transparent conductive layer 21 is disposed on the plate 20, and the masking decoration layer 22 is disposed on the plate 20 and the transparent conductive layer 21.

For example, the sensing circuit structure S' is formed on the plate 20. The plate 20 is directly used as a cover lens, and the sensing circuit structure S' may be formed on the plate 20 by the following procedures:

form a transparent conductive layer 21 on the plate 20;

form a masking decoration layer 22 on the plate 20 and the transparent conductive layer 21; and form a transparent conductive connecting layer 23 on the transparent conductive layer 21 and the masking decoration layer 22, wherein the transparent conductive connecting layer 23, which extends from the transparent conductive layer 21 to the masking decoration layer 22, exceeds the boundary of the transparent conductive layer 21, and the transparent conductive connecting layer 23 may be formed by printing.

The transparent conductive layer 21 defines the touch-sensing circuit after the patterning process, wherein the material of the transparent conductive layer 21 is, for example, indium tin oxide (ITO). The masking decoration layer 22 is made of, for example, an insulation material or various colors of insulation ink. The material of the transparent conductive connecting layer 23 may be the polymer conductive material or indium tin oxide, wherein the polymer conductive material is, for example, the conductive ink, which may be printed on the transparent conductive layer 21 and the masking decoration layer 22. The transparent conductive layer 21 defines a plurality of conductive wires as the touch-sensing circuit in the touch input area of the touch panel 2, wherein the transparent conductive layer 21 in the touch input area is not covered by the masking decoration layer 22.

The outer surface 201 of the plate 20 is for user's operation. Usually, the user views and operates the touch panel 2 from the outer surface 201. The rest of the layer structures and the components are disposed on the inner surface 202 of the plate 20.

As shown in FIG. 4B, the touch panel 2 includes anontransparent conductive layer 24 disposed on the masking decoration layer 22 and the transparent conductive connecting layer 23, but is not on the transparent conductive layer 21. The non-transparent conductive layer 24 may be made of silver adhesive, by which a fine circuitry can be defined on the masking decoration layer 22 through a screen printing equipment collaborated with a silk screen. Moreover, the non-transparent conductive layer 24 may be made of copper, molybdenum, aluminum, etc., and may form the trace by a sputtering process. The non-transparent conductive layer 24 under the masking decoration layer 22 extends in a direction to the transparent conductive layer 21 but does not exceed the boundary of the transparent conductive layer 21.

For example, after each layer in FIG. 4A is formed, the non-transparent conductive layer 24 is formed on the masking decoration layer 22 and the transparent conductive connecting layer 23 but not on the transparent conductive layer. Therefore, the non-transparent conductive layer 24 connects with the transparent conductive layer 21 via the transparent conductive connecting layer 23.

As shown in the FIG. 4C, the touch panel 2 further includes an insulation layer 25, a conductive bonding material 26, and a pin 27, wherein the insulation layer 25 is disposed on the non-transparent conductive layer 24, and the pin 27 is bonded with the non-transparent conductive layer 24 via the conductive bonding material 26.

For example, the insulation layer 25 covers the non-transparent conductive layer 24 by screen printing to protect the non-transparent conductive layer 24 from air oxidation. The pin 27, which may be the pin of a flexible printed circuit board (FPC), is fixed on the transparent conductive layer 24 beside the insulation layer 25 via the conductive bonding material 26 so that the pin 27 is electrically connected with the transparent conductive layer 21 via the conductive bonding material 26 and the non-transparent conductive layer 24. The conductive bonding material 26 may be an anisotropic conductive film (ACF) or an anisotropic conductive paste (ACP).

Figure 5A:
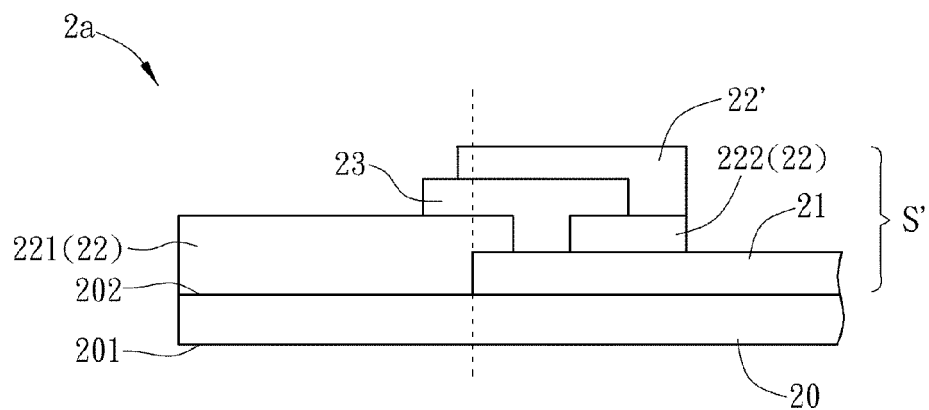
FIG. 5A to FIG. 5B are schematic diagrams of a touch panel according to a further preferred embodiment of the present invention.
Figure 5B:
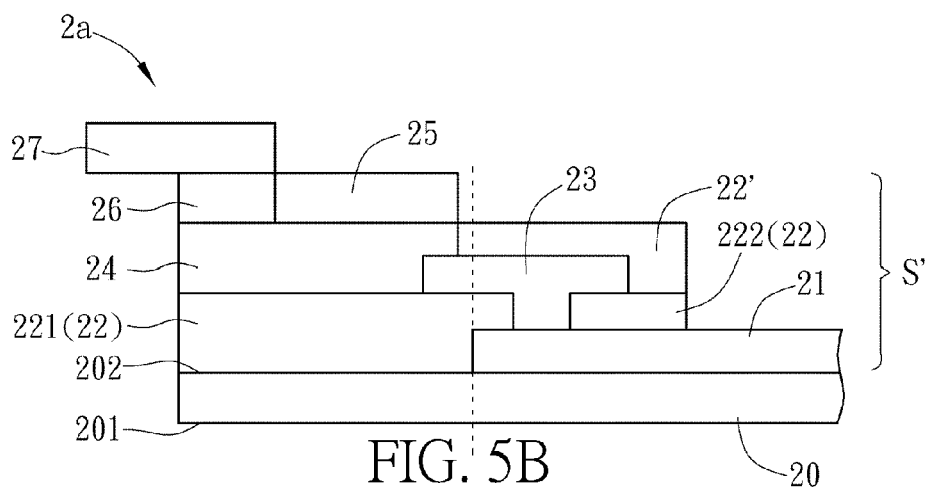

FIG. 5A and FIG. 5B are schematic diagrams of a touch panel 2a according to a preferred embodiment of the present invention. In FIG. 5A, the transparent conductive layer 21 is disposed on the plate 20, and the masking decoration layer 22 is disposed on the plate 20 and the transparent conductive layer 21. The masking decoration layer 22 has an opening, a first portion 221, and a second portion 222, wherein the opening is located above the transparent conductive layer 21 and is in between the first portion 221 and the second portion 222. The transparent conductive connecting layer 23 fills the opening and contacts the transparent conductive layer 21. The structure and manufacturing processes of the transparent conductive layer 21, the masking decoration layer 22, and the transparent conductive connecting layer 23 are similar with those of in FIG. 5A. Besides, another masking decoration layer 22' is formed above the opening of the masking decoration layer 22. The masking decoration layer 22' is at least disposed on the transparent conductive connecting layer 23 in order to mask the opening of the masking decoration layer 22 and prevent the light going through from one side of the touch panel 2a to the other side via the opening.

In this embodiment, the masking decoration layer 22' is disposed on the masking decoration layer 22 and the transparent conductive connecting layer 23, wherein a side of the masking decoration layer 22' extends in a direction to the first portion 221 and exceeds the boundary of the transparent conductive layer 21 but does not exceed the boundary of the transparent conductive connecting layer 23. Therefore, the masking decoration layer 22' limits the subsequent disposition of the non-transparent conductive layer 24. The other side of the masking decoration layer 22' extends in a direction to the second portion 222, but does not exceed the boundary of the masking decoration layer 22.

Color of the masking decoration layers 22, 22' may be the same or similar to each other in order to prevent the user from seeing the opening of the masking decoration layer 22 or finding the color difference between the transparent conductive connecting layer 23 and the masking decoration layer 22. Furthermore, the color and the brightness of the masking decoration layers 22, 22' may be the different. The opening of the masking decoration layer 22 may be designed as a specific pattern such as the product name or the manufacturer trademark. The name or trademark may be presented by the masking decoration layer 22'. When the contrast of the masking decoration layers 22, 22' is sharper, the pattern of the name or the trademark would be more obvious.

As shown in FIG. 5B, the non-transparent conductive layer 24 is disposed on the masking decoration layer 22 and the transparent conductive connecting layer 23, i.e., the opening between the first portion 221 and the second portion 222 is filled by the transparent conductive connecting layer 23 first, and then the non-transparent conductive layer 24 is formed on the masking decoration layer 22 and the transparent conductive connecting layer 23. The structure and manufacturing processes of the non-transparent conductive layer 24 are similar with those of in FIG. 5B. In this embodiment, the non-transparent conductive layer 24 is formed beside the masking decoration layer 22'. Even though the non-transparent conductive layer 24 is not accurately formed beside the masking decoration layer 22', e.g. a portion of the non-transparent conductive layer 24 is formed on the masking decoration layer 22' or a gap exists between the non-transparent conductive layer 24 and the masking decoration layer 22', due to the manufacturing error, the defects are concealed by the masking decoration layers 22, 22'.

Furthermore, the forming sequence of the masking decoration layer 22' and the non-transparent conductive layer 24 is exchangeable. Taking FIG. 5A as an example, the transparent conductive layer 21 is disposed on the plate 20, and the masking decoration layer 22 is disposed on the plate 20 and the transparent conductive layer 21. The masking decoration layer 22 has an opening, the first portion 221, and the second portion 222, wherein the opening is located above the transparent conductive layer 21 and is in between the first portion 221 and the second portion 222. The transparent conductive connecting layer 23 fills the opening to contact the transparent conductive layer 21, but the masking decoration layer 22' has not been formed at this moment. After that, as shown in FIG. 5B, the non-transparent conductive layer 24 is formed first on the masking decoration layer 22 and the transparent conductive connecting layer 23. Then, the masking decoration layer 22' is formed on the opening of the masking decoration layer 22. The masking decoration layer 22' is at least disposed on the transparent conductive connecting layer 23 to cover the opening of the masking decoration layer 22. In this embodiment, the masking decoration layer 22' is formed beside the non-transparent conductive layer 24.

Next, similar as those in FIG. 4C, the insulation layer 25 is disposed on the non-transparent conductive layer 24, and the pin 27 is bonded with the non-transparent conductive layer 24 via the conductive bonding material 26.

Because the non-transparent conductive layer 24 under the masking decoration layer 22 does not reach the boundary of the transparent conductive layer 21, and other external connected non-transparent components do not reach the boundary of the transparent conductive layer 21 either, so neither the non-transparent conductive layer 24 nor the other external connected non-transparent components are disposed above the transparent conductive layer 21. Therefore, when the user views the touch panels 2, 2a from the outer surface 201, no non-transparent components are revealed in the area of the transparent conductive layer 21. Moreover, because the transparent conductive connecting layer 23 is transparent, there is no need to make the color of the masking decoration layer accordance with the transparent conductive connecting layer 23. Therefore, the color of the masking decoration layer can be arbitrary without posing any visual impact. The masking decoration layer 22 can mask the traces in the frame such as the layout in the non-transparent conductive layer 24. Thus, when the user views from the border trace of the frame, the masking decoration layer 22 is visible but not the border traces and neither the color difference between the border traces and other components. As a result, the border traces in the frame of the touch panel is realized without showing a color difference.

In the above embodiments, when the plate is a film, the touch panel may be a flexible touch panel. However, when the plate is a glass, the touch panel may be a rigid touch panel. Certainly, when the plate is a flexible glass, the touch panel may still be flexible.

In the above embodiments, the touch panels 2, 2a may be single plate panels. The plate 20 has three functionalities: the first is to form a sensing circuit structure S'; the second is to be the cover lens; and the third is to mask the internal traces and components. Therefore, the touch panels 2, 2a do not require an additional plate so that the panels are thinner and thereby achieve better light penetration rates. Moreover, because only a plate is used, there is no need to laminate two plates, which prevents from yield loss induced by laminating processes and thus increases the yield. Besides, the manufacturing cost is saved because the laminating processes and the materials required thereof, such as transparent adhesive, thin film, or glass cover, are reduced, and one plate and the optical clear adhesive (OCA) are also saved.

The transparent conductive connecting layer, which extends from the transparent conductive layer to the masking decoration layer, exceeds the boundary of the transparent conductive layer, and the non-transparent conductive layer is disposed on the transparent conductive connecting layer but not on the transparent conductive layer. Therefore, the masking decoration layer masks the non-transparent conductive layer used for border traces in the frame. Furthermore, the touch panel of the present invention only uses a single plate, which is beneficial for making the product thinner.

Regards the three functionalities of the single plate, please refer to the embodiments described above. However, it needs to be specially emphasized that among the three functionalities, the masking function may be achieved by the decoration layer, masking structure, or the masking body within the sensing circuit structure, or the combination of above mentioned.

In the above embodiments, a manufactured single plate touch panel may be assembled with a display panel, i.e., one side of sensing circuit structure is disposed in the touch panel while the other side is assembled with the display panel. The sensing circuit structure is therefore located between the plate of the touch panel and the display panel. For example, the sensing circuit structure may be coated by an optical clear adhesive for assembling the touch panel and the display panel. Note that the optical clear adhesive is not used to assemble two plates of the touch panel because the touch panel of the present invention has only one plate.

In summary, in the single plate touch panel of the present invention, the plate is used not only for disposing the sensing circuit structure to enable conventional touch control functions. In addition, the plate is used as a cover lens because the single plate is disposed in the operation side of the touch panel such that the circuits and components under the plate are protected without being exposed to the outside world. Furthermore, in the implementation, the sensing circuit structure disposed on the plate has the masking function, or alternatively, the masking structure or the masking body may be additionally disposed on the plate. Thus, the plate can cover the border traces or other components which should be invisible to the user such that the plate also has a masking and decoration effect which facilitates realization of full-flat touch panels.

The single plate multi-functional touch panel of the present invention is realized by improving the structure of the plate. In comparison with the prior art, the single plate enables the touch control function and also maintains the structural hardness without an additional laminating a protective film or a cover lens. Therefore, there is no need to form another plate in the touch panel, which further reduces the space and the manufacturing cost of laminating the protective film or the cover lens, and consequently, helps for producing a thin touch panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A touch panel with a single plate, comprising:
a plate, used as a cover; and
a sensing circuit structure, comprising a transparent conductive layer having a plurality of first transparent conductive portions and a plurality of second transparent conductive portions, wherein the first transparent conductive portions are substantially disposed on the plate along with a first axis, and the second transparent conductive portions are substantially disposed on the plate along with a second axis;
wherein the sensing circuit structure further comprises:
a masking decoration layer, disposed on the plate and the transparent conductive layer;
a transparent conductive connecting layer, disposed on the transparent conductive layer and the masking decoration layer, and extending from the transparent conductive layer toward the masking decoration layer and exceeding a boundary of the transparent conductive layer; and a non-transparent conductive layer, disposed on the masking decoration layer and the transparent conductive connecting layer, and is not disposed above the transparent conductive layer.

2. The touch panel of claim 1, wherein the non-transparent conductive layer extends toward the transparent conductive layer on the masking decoration layer and does not exceed a boundary of the transparent conductive layer.

3. The touch panel of claim 1, wherein a material of the masking decoration layer comprises any kind of color ink with insulation, a material of the transparent conductive connecting layer comprises a conductive polymer material or Indium tin oxide (ITO), and a material of the non-transparent conductive layer comprises silver adhesive, copper, molybdenum, or aluminum.

4. The touch panel of claim 1, wherein a color of the masking decoration layer is not in accordance with a color of the transparent conductive connecting layer.

5. The touch panel of claim 1, wherein the masking decoration layer has an opening on the transparent conductive layer, the transparent conductive connecting layer is filled in the opening, and the sensing circuit structure further comprises:

another masking decoration layer, disposed on the transparent conductive connecting layer and covering the opening.

* * * * *